No. 836,159.  
PATENTED NOV. 20, 1906.  
R. A. WEINHARDT.  
POWER TRANSMISSION MECHANISM.  
APPLICATION FILED DEC. 4, 1905.
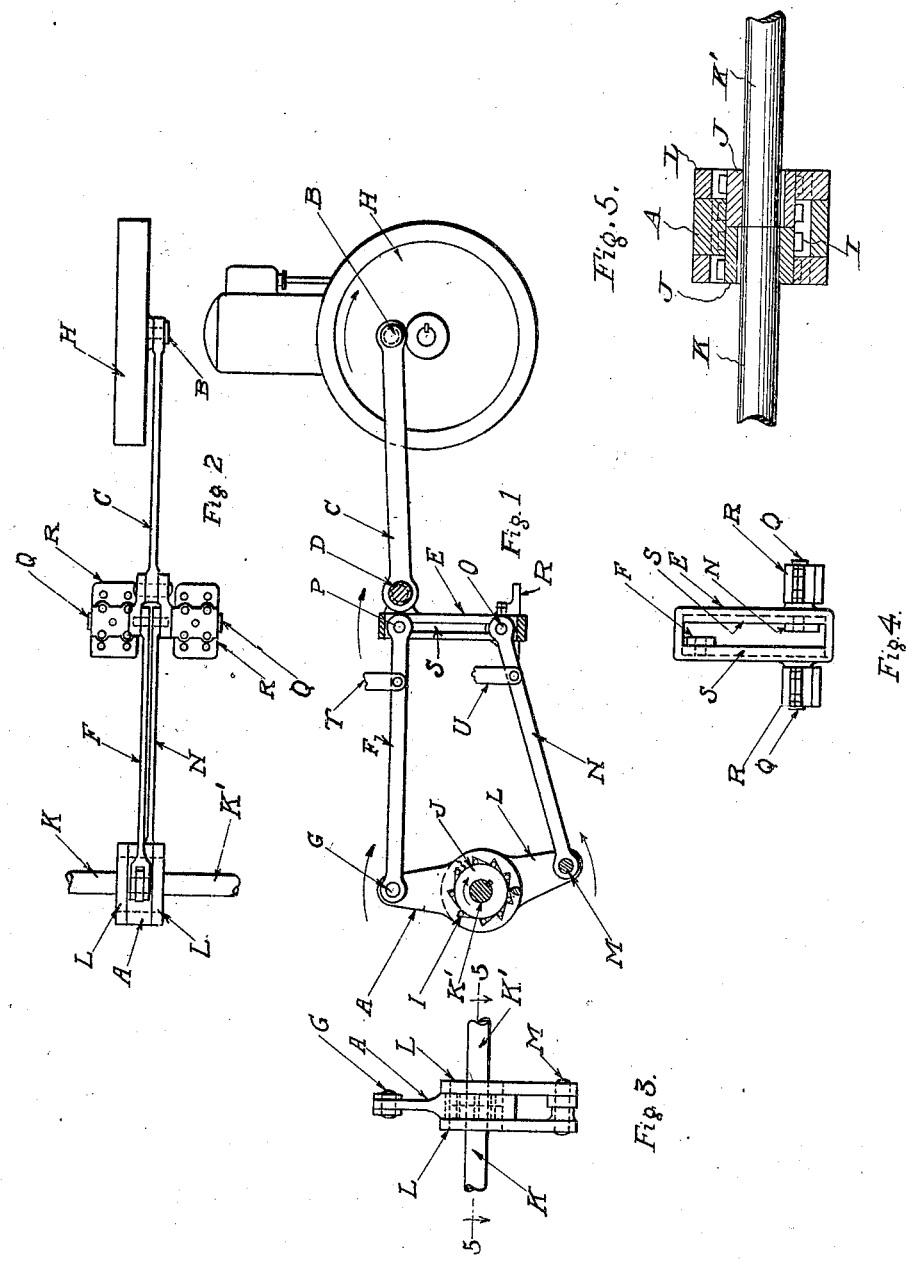
WITNESSES:  
INVENTOR.  
BY  
ATTORNEYS.

UNITED STATES PATENT OFFICE.

ROBERT ALFRED WEINHARDT, OF CHICAGO, ILLINOIS.

POWER-TRANSMISSION MECHANISM.

No. 836,159.　　　Specification of Letters Patent.　　　Patented Nov. 20, 1906.

Application filed December 4, 1905. Serial No. 290,177.

*To all whom it may concern:*

Be it known that I, ROBERT ALFRED WEINHARDT, a citizen of the United States of America, and a resident of Chicago, Cook county, Illinois, have invented certain new and useful Improvements in Power-Transmission Mechanism, of which the following is a specification.

This invention relates to a power-transmission mechanism, and is particularly applicable to power-propelled vehicles and mechanisms driven by explosive-engines and wherein it is desirable to obtain a large range of speeds and permit of reversing the direction of motion without stopping or reversing the motor.

The main objects of this invention are to provide a power-transmission mechanism which is capable of driving a vehicle either forward or backward at any speed intermediate between a standstill and the highest speed of which the motor is capable and without stopping or changing the speed of the motor and to provide a form of transmission mechanism which will positively drive the driving-wheels of the vehicles and at the same time permit either wheel to rotate at a speed in excess of the speed imparted thereto by the driving mechanism, thus greatly reducing the wear on the tires and to a large extent preventing skidding of the wheels when the vehicle is rounding a curve.

I accomplish these objects by the device shown in the accompanying drawings, in which—

Figure 1 is a side elevation, partly in section, of a variable-speed transmission device constructed according to this invention, the supporting-frame and other parts of the vehicle being omitted for the sake of more clearly illustrating the essential elements of the invention. Fig. 2 is a top plan of the same. Fig. 3 is an end elevation viewed from the left of Fig. 1. Fig. 4 is a detail of the rocking lever by means of which the speed is regulated. Fig. 5 is a section on the line 5 5 of Fig. 3.

In the construction shown in the drawings the shafts K and K' represent the driven or rear axle of a motor-propelled vehicle. This axle is in two parts. The shafts K and K' are in axial alinement with each other and are provided with driving-collars J at their adjacent ends. Power is transmitted to the shafts K and K' through the collars J by means of oscillating driving arms or members A and L. These members are connected with the crank-pin B of the motor by means of a system of links, which will be hereinafter described. The member A is loosely mounted concentrically of the shafts K and K' and in such position as to overlap both of the collars J. The member A is provided with two sets of ratchet devices arranged for respectively engaging the collar J on each shaft. These ratchet devices I are preferably of the ball or roller type, so as to operate noiselessly and without loss of motion for gripping and releasing the collars J. The member L consists of two arms adapted to respectively engage the collars J at opposite sides of the arm A. Each of these arms is provided with a separate ratchet device, and the ratchets on the member L are arranged to drive the shafts K and K' in the direction opposite to that of the rotation imparted by the member A. The forward direction of rotation is indicated by arrows in Fig. 1.

In the drawings the crank-pin B is represented as a stud on one face of the fly-wheel H of the motor. Journaled upon horizontally-disposed trunnions at a point between the motor and the shafts K and K' is a rocking lever E. The lever E is carried by trunnions Q at its lower end, and said trunnions are carried by bearings R, mounted on an adjacent part of the supporting-frame of the vehicle. The upper end of the rocking lever E is connected with the crank-pin B by means of a link C, said link being pivoted at D. The lever E is of open rectangular form and has a pair of radially-disposed guides S, within which are slidably mounted the wrist-pins P and O of the links F and N, which respectively connect the lever E with the arms A and L. The wrist-pins P and O are slidable on the lever E toward and away from the axial center line of the trunnions Q. The position of the wrist-pins P and O with respect to the axis of the trunnions Q is controlled by links T and U. These links are connected with operating-levers which are located in convenient reach of the driver of the vehicle, but are not shown in the drawings. The links F and N are pivotally mounted on the members A and L at G and N, respectively.

The operation of the device shown is as follows: Assume that the motor is continuously driven in one direction—for instance, the direction indicated by the arrow on the fly-wheel H. The rotation of the crank-pin B causes the rocking lever E to oscillate backward and forward through an arc corresponding in length to the diameter of the circle of rotation of the crank-pin B. This oscillating movement may be transmitted to either of the members A and L by means of the links F and N. The length of the arc through which the members A and L oscillate is dependent upon the position of their respective wrist-pins with respect to the axis of the trunnions Q. In Fig. 1 of the drawings the wrist-pin O is at the neutral point, and therefore imparts no movement to the reverse driving member L. The wrist-pin P is at the extreme limit of its adjustment away from the axis of the trunnions and is therefore at the position corresponding to the greatest speed ahead. The amplitude of the oscillation of the member A is in this case of the same length as that of the rocking lever E. By shifting the wrist-pin P toward the axis of the trunnions Q any intermediate speed may be had between the full speed and no speed. When the wrist-pins P and O are both in alinement with the axis of the trunnions Q, then the vehicle will receive no driving impulse either forward or backward. When the wrist-pin O is shifted away from the axial center line of the trunnions, the vehicle will be driven in a reverse direction, and the speed may be regulated by shifting said wrist-pin so as to drive the vehicle in a reverse direction at any speed at which it is capable of going ahead.

Since the two shafts K are not connected except through the driving-ratchets, either of said shafts may rotate without resistance at a speed greater than that at which it is driven by the driving-ratchet, and each is in this respect independent of the other. This feature is particularly useful, in that it permits the vehicle to pass around a curve with little or no skidding of the wheels, due to the difference in the radius of the arc in which each wheel is turning. The outer wheel will in this case exceed the speed of the inner wheel through being driven in advance of the driving mechanism by its contact with the pavement.

What I claim as my invention, and desire to secure by Letters Patent, is—

1. In a power-transmission device, the combination of a pair of shafts journaled in axial alinement with each other and a pair of driving members having ratchet connection with each of said shafts, said members being respectively arranged for rotating said shafts in opposite directions, and said ratchet connections being arranged to permit either shaft to rotate freely at a speed greater than the speed imparted thereto by said driving members.

2. A power-transmission device, comprising a driven shaft, a pair of members having ratchet connection with said shaft and respectively adapted for rotating said shaft in opposite directions, links connected to said members, a lever mounted on trunnions at one side of said shaft and connected with both of said links, mechanism for oscillating said lever on its trunnions, each of said links having sliding pivotal connection with said lever and said pivotal connections being slidable into and out of axial alinement with the trunnions of said lever for varying the throw of the ratchet members.

3. In a power-transmission device, the combination of a pair of shafts journaled in axial alinement with each other, a pair of driving members, each having ratchet connection with each of said shafts, one of said members being arranged for rotating both shafts in one direction, the other member being arranged to drive the shafts in a reverse direction, and said ratchet connections being arranged to permit either shaft to rotate at a speed greater than the speed imparted thereto by said driving members, and mechanism for imparting oscillatory movement to either of said members when the other is inactive.

4. In a power-transmission device, the combination of a pair of shafts journaled in axial alinement with each other, a pair of driving members, each having ratchet connection with each of said shafts, one of said members being arranged for rotating both shafts in one direction and the other member being adapted to drive the shafts in the reverse direction, said ratchet connections being arranged to permit either shaft to rotate at a speed greater than the speed imparted thereto by said driving members, mechanism for imparting an oscillatory movement to either of said members when the other is inactive, and means for varying the amplitude of the oscillations of said members, substantially as described.

5. In a power-transmission device, the combination of a pair of shafts journaled in axial alinement with each other, a pair of driving members loosely journaled concentrically of said shafts and each having separate ratchet connection with each of said shafts and being respectively adapted to drive said shafts in opposite directions, a lever pivotally mounted at one side of said shafts, mechanism for oscillating said lever, links connecting each of said driving members with said lever, said links having sliding pivotal connection with said lever and each being adjustable along said lever toward and away from the pivotal axis thereof, for imparting a variable oscillatory movement to said members, substantially as described.

Signed at Chicago this 25th day of November, 1905.

ROBT. ALFRED WEINHARDT.

Witnesses:
 EUGENE A. RUMMLER,
 L. A. SMITH.